United States Patent
Henmi

(10) Patent No.: US 10,984,386 B2
(45) Date of Patent: Apr. 20, 2021

(54) INTERVIEW SYSTEM

(71) Applicant: Universal Entertainment Corporation, Tokyo (JP)

(72) Inventor: Takuo Henmi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 312 days.

(21) Appl. No.: 15/640,494

(22) Filed: Jul. 1, 2017

(65) Prior Publication Data
US 2018/0018632 A1    Jan. 18, 2018

(30) Foreign Application Priority Data
Jul. 14, 2016   (JP) .............................. JP2016-139190

(51) Int. Cl.
| | |
|---|---|
| *G06Q 10/10* | (2012.01) |
| *G06Q 10/00* | (2012.01) |
| *G06Q 10/06* | (2012.01) |
| *G06Q 30/08* | (2012.01) |
| *G06Q 30/02* | (2012.01) |
| *B25J 11/00* | (2006.01) |

(52) U.S. Cl.
CPC ...... *G06Q 10/1053* (2013.01); *B25J 11/0005* (2013.01)

(58) Field of Classification Search
CPC .............. G06Q 10/1053; G06Q 10/105; B25J 11/0005
USPC ................................ 705/1.1–912, 320, 321
See application file for complete search history.

(56) References Cited

U.S. PATENT DOCUMENTS

| | | | | |
|---|---|---|---|---|
| 5,117,353 | A * | 5/1992 | Stipanovich | G06Q 10/06 705/7.14 |
| 5,978,768 | A * | 11/1999 | McGovern | G06Q 10/1053 705/321 |
| 6,275,812 | B1 * | 8/2001 | Haq | G06Q 10/063112 705/7.14 |
| 7,054,821 | B1 * | 5/2006 | Rosenthal | G06Q 10/06 705/348 |
| 7,080,057 | B2 * | 7/2006 | Scarborough | G06Q 10/063 706/60 |

(Continued)

OTHER PUBLICATIONS

Khosla et al., "Innovative Embodiment of Job Interview in Emotionally Aware Communication Robot," Proceedings of International Joint Conference on Neural Networks, pp. 1546-1552, Aug. 5, 2011 (Year: 2011).*

(Continued)

*Primary Examiner* — Jonathan P Ouellette
(74) *Attorney, Agent, or Firm* — Potomac Law Group, PLLC; Kenneth Fagin

(57) ABSTRACT

An interview apparatus configured to obtain response information through questions and answers with an applicant, an interview controller configured to control the interview apparatus and determine an interview evaluation level which is quantification of aptitude of the applicant based on the response information obtained by the interview apparatus, a storage device configured to store an applicant information database in which the response information and the interview evaluation level are stored in association with the applicant, and a terminal device configured to be able to access the applicant information database in the storage device are provided.

3 Claims, 13 Drawing Sheets

(56) References Cited

U.S. PATENT DOCUMENTS

| | | | | |
|---|---|---|---|---|
| 7,191,138 B1* | 3/2007 | Roy | G06Q 10/0631 | 705/321 |
| 7,219,066 B2* | 5/2007 | Parks | G06Q 40/04 | 705/1.1 |
| 7,502,748 B1* | 3/2009 | Baldwin | G06Q 10/06 | 705/7.14 |
| 7,606,778 B2* | 10/2009 | Dewar | G06Q 10/0631 | 706/21 |
| 7,684,977 B2* | 3/2010 | Morikawa | G10L 15/22 | 704/211 |
| 2003/0071852 A1* | 4/2003 | Stimac | G06Q 10/10 | 715/810 |
| 2003/0093322 A1* | 5/2003 | Sciuk | G06Q 10/1053 | 705/7.32 |
| 2003/0191680 A1* | 10/2003 | Dewar | G06Q 10/0631 | 706/45 |
| 2007/0198319 A1* | 8/2007 | Sciuk | G06Q 10/0631 | 705/7.26 |
| 2007/0198572 A1* | 8/2007 | Sciuk | G06F 16/00 | |
| 2008/0086504 A1* | 4/2008 | Sanders | G06Q 10/06 | |
| 2009/0187446 A1* | 7/2009 | Dewar | G06Q 10/0639 | 706/45 |
| 2009/0299993 A1* | 12/2009 | Novack | G06Q 10/06 | |
| 2009/0319289 A1* | 12/2009 | Pande | G06Q 10/105 | 705/1.1 |
| 2011/0055098 A1* | 3/2011 | Stewart | G06Q 10/00 | 705/321 |
| 2012/0185402 A1* | 7/2012 | Lajoie | G06Q 10/10 | 705/321 |
| 2012/0221477 A1* | 8/2012 | Pande | G06Q 10/10 | 705/321 |
| 2012/0264101 A1* | 10/2012 | Krohner | G09B 7/00 | 434/359 |
| 2013/0311244 A1* | 11/2013 | Abotchie | G06Q 10/06393 | 705/7.39 |
| 2015/0046357 A1* | 2/2015 | Danson | G06Q 10/1053 | 705/321 |
| 2016/0196534 A1* | 7/2016 | Jarrett | G06Q 10/1053 | 705/321 |
| 2017/0213190 A1* | 7/2017 | Hazan | G10L 25/63 | |
| 2018/0004915 A1* | 1/2018 | Talbot | G09B 7/06 | |
| 2018/0005163 A1* | 1/2018 | Ramo | G06Q 10/06 | |

OTHER PUBLICATIONS

PRNewswire, "HireVue Redefines Technical Talent Recruiting with Acquisition of CodeEval: Top Programmers and Developer Candidates Are Easily Sourced and Evaluated Through Integration of CodeEval and HireVue On-Demand Digital Interviewing Platform," PR Newswire Association LLC. (Aug. 2, 2012). (Year: 2012).*

* cited by examiner

F IG .3
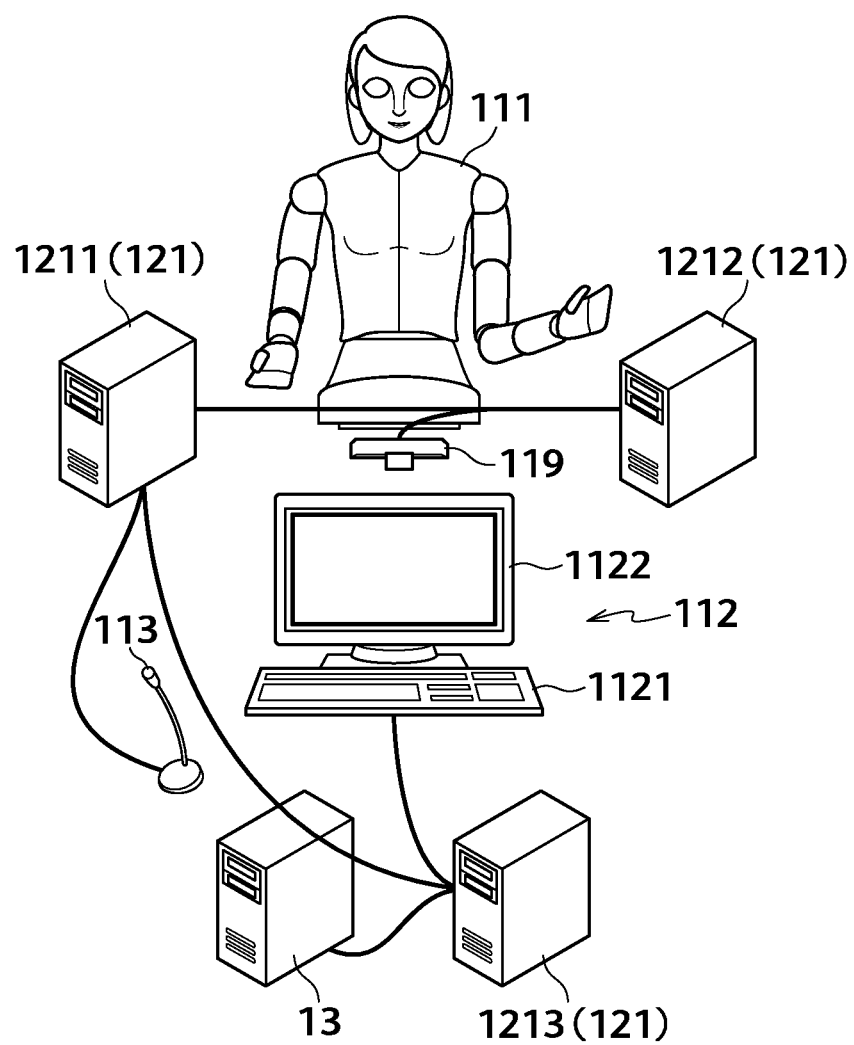

FIG.9

| APPLICANT | RESPONSE INFORMATION | INTERVIEW EVALUATION LEVEL | RESEMBLANCE 1 (JOB 1) | RESEMBLANCE 2 (JOB 2) | RESEMBLANCE 3 (JOB 3) | ... | RESEMBLANCE N (JOB N) |
|---|---|---|---|---|---|---|---|
| A1 | a1(1,1)~a1(n,m) | b1(1)~b1(N) | 20 | 56 | 84 | | 15 |
| A2 | a2(1,1)~a2(n,m) | b2(1)~b2(N) | 67 | 12 | 59 | | 17 |
| A3 | a3(1,1)~a3(n,m) | b3(1)~b3(N) | 24 | 90 | 11 | | 78 |
| A4 | a4(1,1)~a4(n,m) | b4(1)~b4(N) | 92 | 25 | 17 | | 22 |
| A5 | a5(1,1)~a5(n,m) | b5(1)~b5(N) | 15 | 88 | 26 | | 43 |
| A6 | a6(1,1)~a6(n,m) | b6(1)~b6(N) | 76 | 15 | 87 | | 89 |
| ... | | | ... | | | | |
| Ai | ai(1,1)~ai(n,m) | bi(1)~bi(N) | 21 | 35 | 37 | | 91 |

SAMPLE OF REGISTRATION SCREEN

REGISTERED INFORMATION

NAME
PHONE NUMBER
EMAIL ADDRESS
DESIRED JOB

REGISTRATION

F IG .12
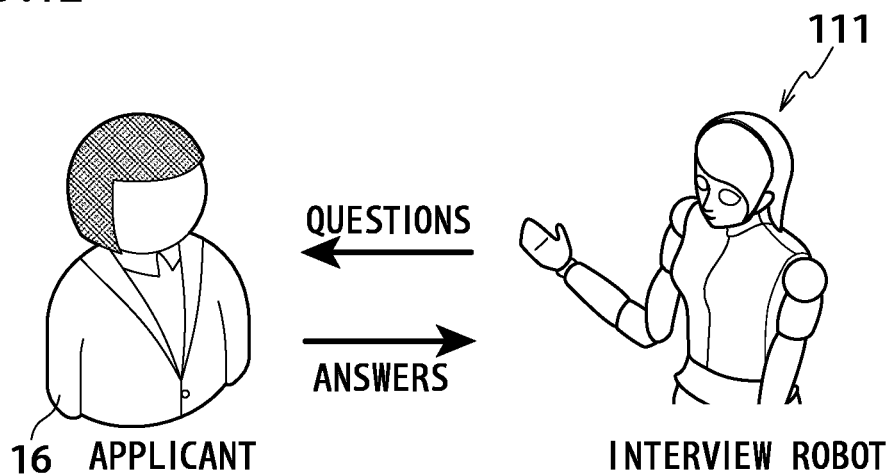
F IG .13
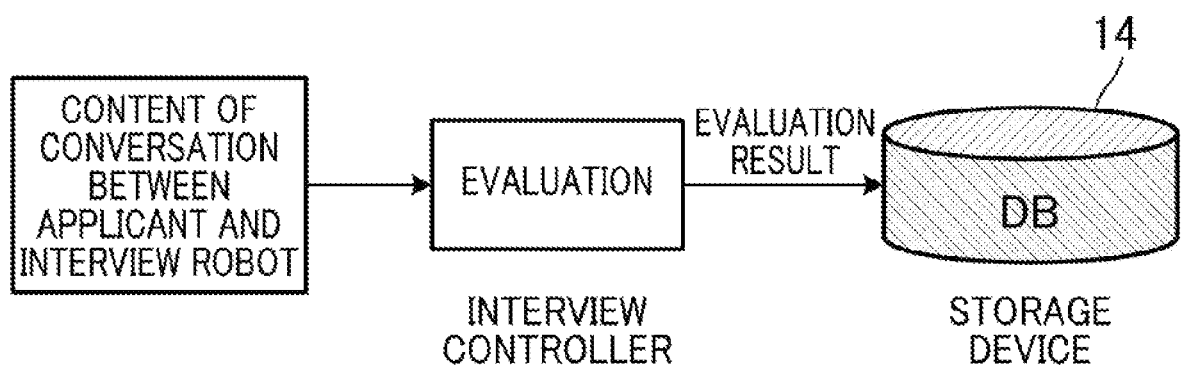

INTERVIEW SYSTEM

CROSS-REFERENCE TO RELATED APPLICATION

This application is entitled to the benefit of Japanese Patent Application (Tokugan 2016-139190) filed on Jul. 14, 2016.

FIELD OF THE INVENTION

The present invention relates to an interview system.

BACKGROUND OF THE INVENTION

These days, an interview of an applicant is sometimes performed by a humanoid robot instead of a human interviewer and whether or not the applicant is employed for a job opening is determined based on response information obtained through questions and answers. Such a case is described in "Job Hunting! Interviewer is robot "Pepper"??", [online], [retrieved on Jun. 21, 2016] from the Internet <URL: http://w-sc.jp/shukatsu-peppr>. With this, even when interviews take long hours due to a large number of applicants, the humanoid robot performs an interview with each applicant based on the same standards, and hence whether each applicant is employed is determined in a stable manner.

The interview and the determination of the employment by using the humanoid robot, however, are disadvantageous in that, when there are a plurality of job openings, an applicant who was rejected from one job opening is requested to have a similar interview again when applying to another job opening. As a result, it takes long time to find an applicant suitable for each job opening.

BRIEF SUMMARY OF THE INVENTION

An object of the present invention is to provide an interview system which makes it possible to find an applicant suitable for a job opening in a short time.

The present invention relates to an interview system including an interview apparatus configured to obtain response information through questions and answers with an applicant, an interview controller configured to control the interview apparatus and determine an interview evaluation level which is quantification of aptitude of the applicant based on the response information obtained by the interview apparatus, a storage device configured to store an applicant information database in which the response information and the interview evaluation level are stored in association with the applicant, and a terminal device configured to be able to access the applicant information database in the storage device.

With this arrangement, it is possible to find an applicant suitable for a job opening by accessing the applicant information database via the terminal device and checking the interview evaluation level which is quantification of each applicant's aptitude.

The interview controller may be configured to calculate resemblance of the interview evaluation level with a talent evaluation level which is quantification of the best aptitude for each job, and the storage device may be configured to store the applicant information database in which the resemblance to each job is associated with the applicant.

With this arrangement, it is possible to find an applicant suitable for a job opening by accessing the applicant information database by means of the terminal device and sampling or reordering the applicants based on the resemblance of the interview evaluation level with the talent evaluation level which is quantification of the aptitude best for each job.

The interview apparatus of the present invention may include a humanoid robot main body which includes a right arm, a left arm, a body supporting the right arm and the left arm, and a head provided at an upper end of the body, and is configured to obtain the figure and voice of the applicant as the response information.

With this arrangement, because the humanoid robot main body performs questions and answers with an applicant, it is as if a human interviewer is present in the interview environment.

The interview apparatus of the present invention may include an interview-side input device which allows the applicant to input the response information.

According to this arrangement, the reliability of the resemblance of the interview evaluation level can be improved because speed, rhythm, time of input, and the like when the applicant inputs the response information to the interview-side input device are used as new response information.

The terminal device of the present invention may include a terminal-side input device by which a job opening can be input; a display device; and a terminal controller configured to display, on the display device, the degree of recommendation of each applicant to the job opening in association with the resemblance.

With this arrangement, as a job opening is input by the terminal-side input device, an applicant suitable for the job opening is easily and rapidly selected from applicants, based on the degree of recommendation of each applicant displayed on the display device.

The terminal controller of the terminal device of the present invention may cause the display device to display a job with resemblance equal to or higher than a predetermined value.

With this arrangement, in addition to the degree of recommendation of each applicant to the job opening, it is possible to easily check what other jobs are suitable for each applicant.

The present invention is able to provide an interview system which makes it possible to find an applicant suitable for a job opening in a short time.

BRIEF DESCRIPTION OF THE DRAWINGS

FIG. 3 is a schematic view of the interview apparatus.

FIG. 9 illustrates an applicant information table.

FIG. 12 illustrates a process of interview with an applicant.

FIG. 13 illustrates a processing path of response information.

DETAILED DESCRIPTION OF THE PREFERRED EMBODIMENT

The following will describe an embodiment of the present invention with reference to the drawings.

(Interview System: Outline)

Figure 1:
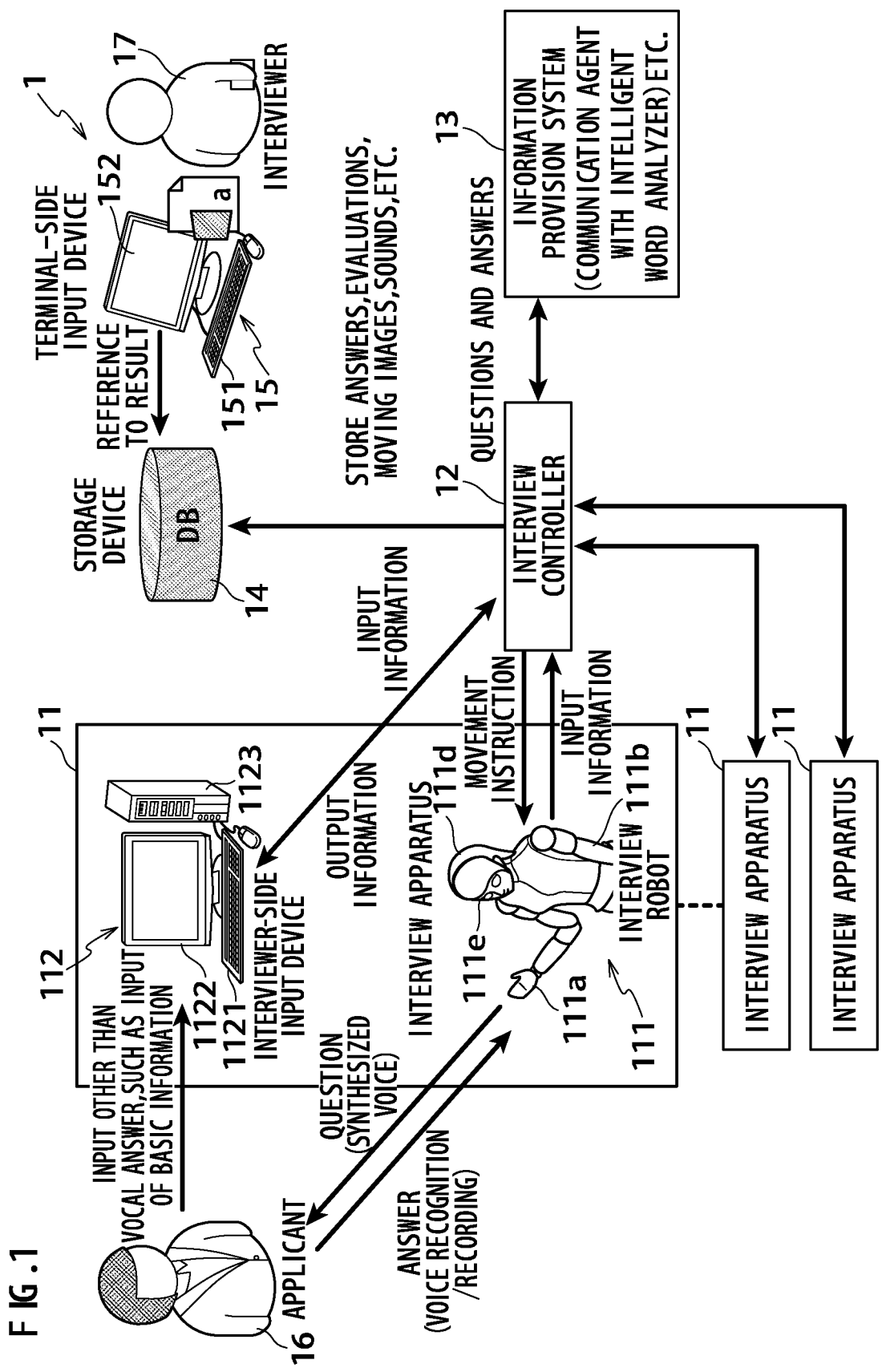
FIG. 1 is a schematic block diagram of an interview system.

As shown in FIG. 1, the interview system 1 includes one or more interview apparatus 11, an interview controller 12, a storage device 14, and a terminal device 15. The interview apparatus 11 is configured to obtain response information generated through questions and answers with an applicant 16. The interview apparatus 11 is configured to be able to perform questions and answers with one applicant. With this arrangement, the interview system 1 prevents waiting time for interview from becoming excessive due to a large number of applicants 16, without increasing costs for the interview system 1, by suitably increasing or decreasing the number of interview apparatuses 11 in accordance with the number of applicants and the number of job openings.

The interview apparatuses 11 are connected with the interview controller 12 to be able to perform data communications therewith. The interview apparatuses 11 and the interview controller 12 may be connected with each other by a dedicated line or over the Internet. The data communications are preferably encrypted for the purpose of preventing leakage of personal information of the applicants 16.

The interview controller 12 is able to send and receive a control signal and an information signal to and from the interview apparatuses 11. The interview controller 12 is therefore able to control the interview apparatuses 11 by sending and receiving the control signal. Furthermore, the interview controller 12 is configured to obtain response information by sending and receiving the information signal and determine interview evaluation levels which are quantification of applicant's aptitude based on the response information. With this arrangement, the interview controller 12 makes it possible to find an applicant suitable for a job opening by checking interview evaluation levels which are quantification of each applicant's aptitude.

In addition to the above, the interview controller 12 is configured to calculate the resemblance of interview evaluation levels with talent evaluation levels which are quantification of the best aptitude for each job. With this arrangement, the interview controller 12 is able to sample or reorder the applicants based on the resemblance of interview evaluation levels with the talent evaluation levels which are quantification of the best aptitude for each job, in order to easily find an applicant suitable for a job opening. The descriptions below deal with a case where the aptitude is constituted by two parts, i.e., general aptitude and professional aptitude. The disclosure is not limited to this arrangement, and another aptitude may be added, or the aptitude may be only one of the general aptitude and the professional aptitude.

The interview controller 12 is connected with an information provision system 13 to be able to send and receive an information signal to and from the information provision system 13. The information provision system 13 is configured to provide question information to the interview controller 12 in order to cause the interview apparatus 11 to ask a question to an applicant 16, and analyze the answer of the applicant 16 to the question. The interview controller 12 is connected with the storage device 14. The storage device 14 stores applicant information database in which the response information, the interview evaluation levels, and the resemblance with each job are stored in association with each applicant 16. The storage device 14 is connected with the terminal device 15 so as to be able to send and receive an information signal to and from the terminal device 15. The terminal device 15 allows a recruiter 17 to access the applicant information database in the storage device 14.

With the interview system 1 structured as above, it is possible to find an applicant suitable for a job opening by accessing the applicant information database by means of the terminal device 15 and sampling or reordering the applicants 16 based on the resemblance of the interview evaluation levels with the talent evaluation levels set for the respective jobs. Furthermore, the interview system 1 reduces the workload of personnel management officers when, for example, it is necessary to hire a large number of people. Furthermore, because interviews are carried out by the interview apparatuses 11, evaluations are systematic and fair based on a constant standard. For this reason, it is possible to prevent arbitrary evaluations related to nepotism, bribery, etc., and hence opportunities are equally open to all. Furthermore, because interviews can be done without any human intervention, it is possible to operate the interview system 1 for 24 hours.

(Interview System: Interview Apparatus: Interview Robot)

The interview apparatus 11 includes a humanoid robot main body 111 which is an interview robot. While the following description deals with a case where the interview apparatus 11 is provided with the robot main body 111, the disclosure is not limited to this arrangement.

The robot main body 111 includes a right arm 111a, a left arm 111b, a body 111c supporting the right arm 111a and the left arm 111b, and a head 111d provided at an upper end of the body 111c, and the robot main body 111 is configured to obtain the figure and voice of an applicant 16 as response information. With this arrangement, because in the interview apparatus 11 the humanoid robot main body 111 performs questions and answers with an applicant 16, it is as if a human interviewer is present in the interview environment.

Each of the right arm 111a and the left arm 111b is able to move an arm leading end portion (hand portion) to a given position in a three-dimensional space. A plurality of fingers are provided at the arm leading end portion (hand portion) to allow the arm to point at something and to hold an article. With this arrangement, it is possible in the interview to conduct questions and answers in various ways, for example, to shake hands with an applicant 16, to vocally ask a question with gestures, or to ask a question solely by gestures.

In the present embodiment, the robot main body 111 has two arms, i.e., the right arm 111a and the left arm 111b to be similar to human. The disclosure, however, is not limited to this arrangement, and the number of arms may be one or more.

The head 111d at the upper part of the body 111c is provided with a conversation mechanism 111e by which conversations with an applicant 16 are performed. The conversation mechanism 111e includes an information output mechanism configured to output question information to an applicant 16 by means of synthesized voice and an information acquisition mechanism configured to acquire plural types of response information such as voice, posture, motion, and expression from the answering applicant 16.

Examples of the information output mechanism include a speaker mechanism configured to output sound. The speaker mechanism includes: a digital amplifier which amplifies voice signals and a speaker which converts electrical signals from the digital amplifier to sound waves and outputs sound. Examples of the information acquisition mechanism include a camera mechanism configured to acquire images and a microphone mechanism configured to acquire sound. The camera mechanism is configured to film the face of the applicant 16 and includes at least one of a voice angle sensor, a 3D sensor, and a full-HD camera. At least a part of the conversation mechanism 111e may be provided at a position different from the robot main body 111. The structure of the interview apparatus 11 will be specifically described later.

In this way, because in the interview system 1 the interview robot faces the applicant 16 as an interviewer, answers of the applicant 16 may show the applicant's true colors. Furthermore, the response information obtained by the interview apparatus 11 may be combined with image recognition technology or the like, so that something more than simple answers to questions can be taken into consideration in the evaluation.

(Interview System: Interview Apparatus: Interview-Side Terminal Device)

In addition to the above, the interview apparatus 11 includes an interview-side input device 112 which allows an applicant 16 to input response information. The interview-side input device 112 includes components such as a keyboard 1121, a display 1122, a controller 1123, and a mouse. The interview-side input device 112 is arranged to be able to operate in sync with the robot main body 111. To be more specific, after causing the robot main body 111 to ask a question or give an instruction to the applicant 16, the interview apparatus 11 receives a response input by the applicant 16 by using keys of the interview-side input device 112, in parallel to questions and answers performed by the robot main body 111. This makes it possible to set at least one of key input elements such as speed, rhythm, and time of input of the response information by the applicant 16 as response information different from the response information obtained by the robot main body 111, with the result that the reliability of the resemblance of the interview evaluation levels is improved.

Furthermore, the interview-side input device 112 may be arranged to be able to perform a visual acuity test and a color weakness test by means of the display 1122. This makes it possible to exclude jobs which involve restriction regarding visual acuity and color weakness from the jobs selectable by the applicant 16, and to notify the applicant 16 of applicable jobs and not-applicable jobs. The notification may be verbally done by the robot main body 111 during the interview, may be displayed on the display 1122 of the interview-side input device 112, or may be e-mailed after the interview. Preferably, the robot main body 111 moves the right arm 111a or the left arm 111b to point a region which is viewed by the robot. With this arrangement, the applicant 16 feels as if he/she is interviewed by a human.

In addition to the above, the interview-side input device 112 may be configured to run business software such as spread sheet software, graphic editor software, and design software, and performs operations in response to inputs from the applicant 16. This makes it possible to easily grasp the applicant's proficiency level of each type of business software. Also in this case, preferably, the robot main body 111 moves the right arm 111a or the left arm 111b to point a region to be processed or a target image while verbally explaining the content of business software or a processing procedure. With this arrangement, the applicant 16 feels as if he/she is interviewed by a human.

(Interview System: Specific Structure of Interview Apparatus)

Figure 2:
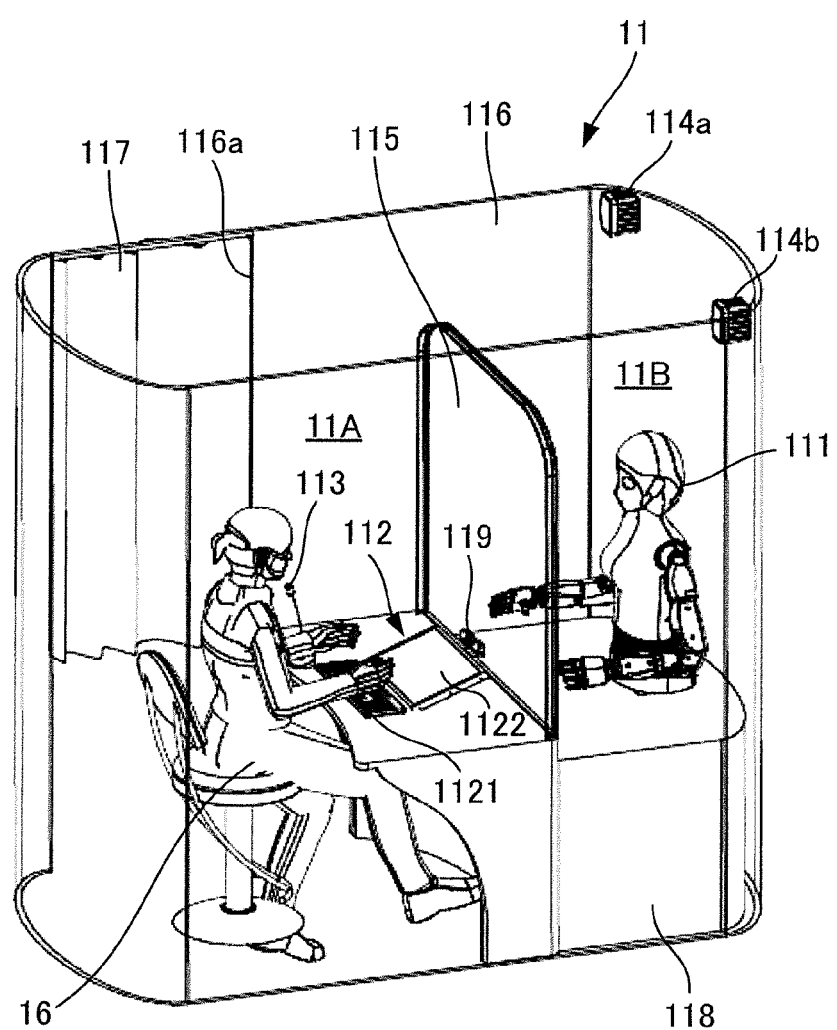
FIG. 2 is a perspective view of an interview apparatus.

The interview apparatus 11 will be specifically described with reference to FIG. 2. The interview apparatus 11 is provided with a hollow rectangular parallelepiped wall portion 116. The wall portion 116 forms an interview room. Inside the wall portion 116, a transparent partition 115 is provided. The partition 115 divides the interview room into an applicant room 11A in which an applicant 16 sits and a robot room 11B in which the robot main body 111 is provided. With this arrangement, the applicant 16 and the robot main body 111 face one-on-one with each other over the partition 115.

In the applicant room 11A, a passage 116a is formed as an opening between the upper end to the lower end of the wall portion 116. The passage 116a allows the applicant 16 to enter or leave the applicant room 11A. The passage 116a is provided with a curtain 117. The curtain 117 is able to close the passage 116a so that the inside of the applicant room 11A cannot be seen from the outside during an interview.

The partition 115 is provided substantially at a central portion of the upper surface of a supporting base 118. A part on the applicant room 11A side of the supporting base 118 is formed to be a desk. On the upper surface of the desk part, members constituting the interview-side input device 112, such as the display 1122 and the keyboard 1121, are placed, and a microphone 113 is provided to obtain voice of the seated applicant 16. At a central portion of the lower end of the partition 115, an image analysis device 119 is provided to obtain images including that of the face of the applicant 16, analyze the expression, gesture, and the like, and output a result of the analysis. An example of the analysis device 119 is RealSense (registered trademark).

Meanwhile, at a part on the robot room 11B side of the supporting base 118, the robot main body 111 is provided for conducting an interview. Above the robot main body 111, speakers 114a and 114b are provided to output sound of interview questions or the like. The speakers 114a and 114b are provided at an upper end portion of the wall portion 116.

Inside the supporting base 118, an interview controller 12 shown in FIG. 1 is provided. As shown in FIG. 3, the interview controller 12 is formed of a robot controller 1211 configured to execute a robot controlling process, a camera controller 1212 configured to execute an imaging process, and a control agent controller 1213. The control agent controller 1213 has a control agent function of providing an instruction to each of the information provision system 13 and the robot controller 1211.

Figure 4:
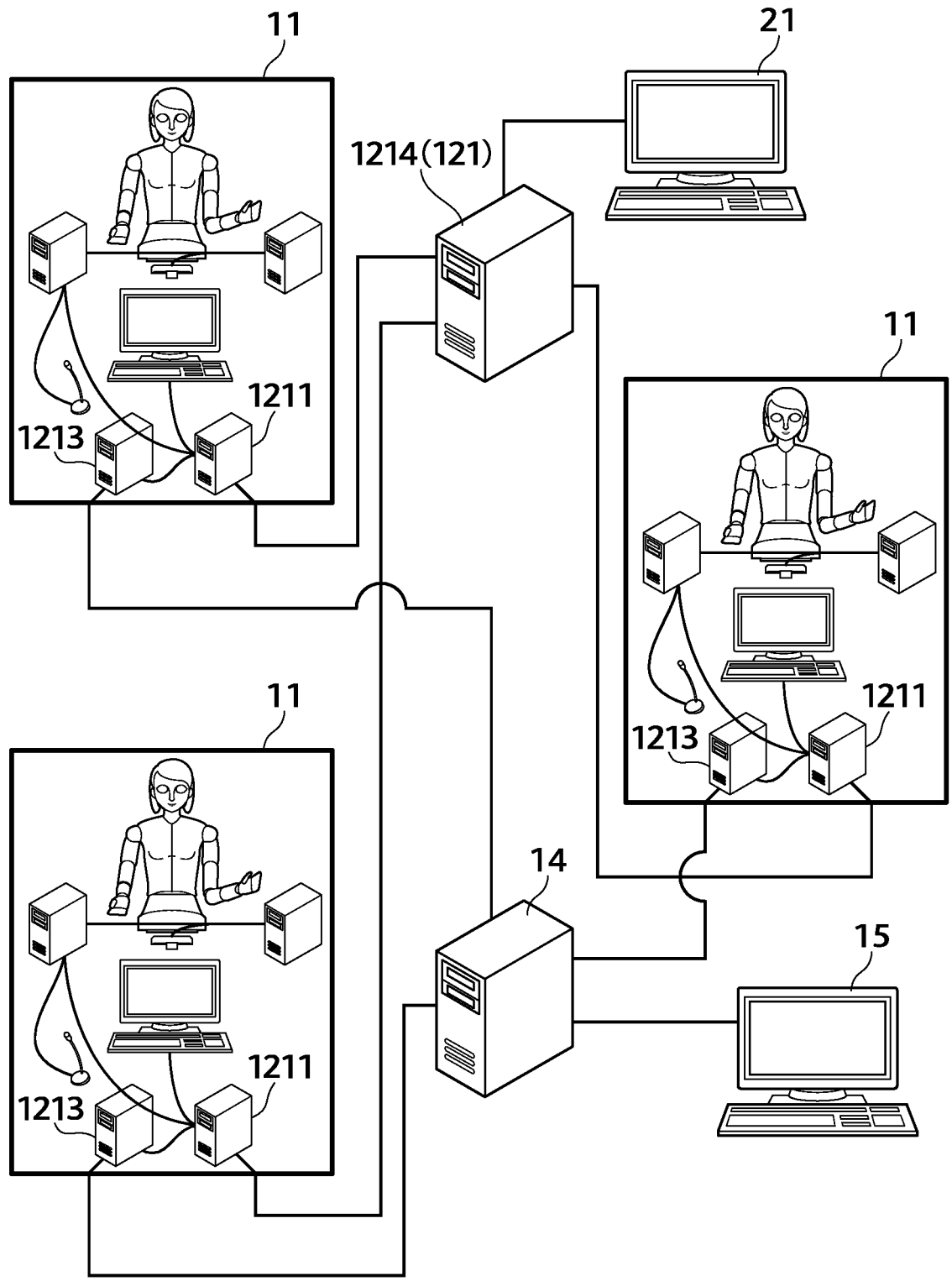
FIG. 4 is a schematic view of the interview system.

As shown in FIG. 4, the interview system 1 may include a plurality of interview apparatuses 11. In such a case, the interview controller 12 includes a supervisory controller 1214. The supervisory controller 1214 is connected with the robot controller 1211 of each interview apparatus 11 to monitor the state of the robot main body 111 at each interview controller 12. The supervisory controller 1214 is connected with a robot monitoring terminal 21. This makes it possible to centrally monitor the interview apparatuses 11.

The storage device 14 as a database server is connected with the control agent controller 1213 of each interview apparatus 11. The storage device 14 is configured to store a plurality of types of information such as the response information of the applicant 16 obtained from the control agent controller 1213. The interview system 1 shown in FIG.

4 is preferably chosen when a plurality of interview apparatuses 11 are provided in a single room.

Figure 5:
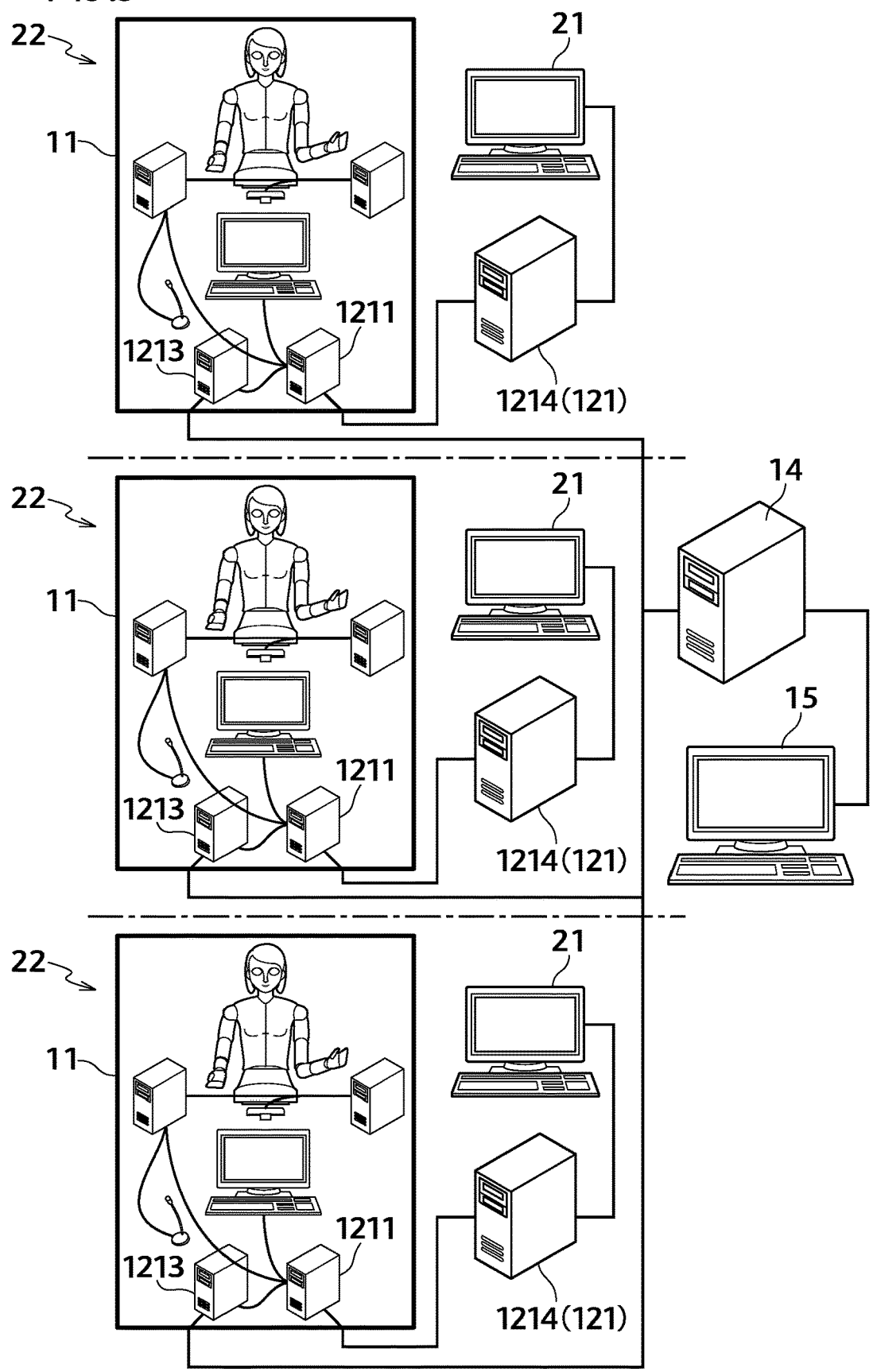
FIG. 5 is a schematic view of the interview system.

As shown in FIG. 5, the interview system 1 may be arranged such that the interview apparatuses 11 are provided in different rooms or provided to be remote from one another. To be more specific, a single interview unit 22 is constituted by one or more interview apparatus 11, a supervisory controller 1214, and a robot monitoring terminal 21, such interview units 22 are provided at plural positions, and control agent controllers 1213 of the respective interview units 22 are connected with a single storage device 14.

(Interview System: Interview Controller)

As shown in FIG. 1, the interview controller 12 is arranged to be able to execute a process of sending an operation instruction to the robot main body 111, a process of receiving response information which is input information sent from the robot main body 111, and a process of sending output information to the interview-side input device 112 and receiving input information (response information) from the interview-side input device 112. Furthermore, the interview controller 12 is arranged to be able to calculate resemblance based on the obtained response information. The following will specifically describe how the resemblance is calculated.

Figure 6:
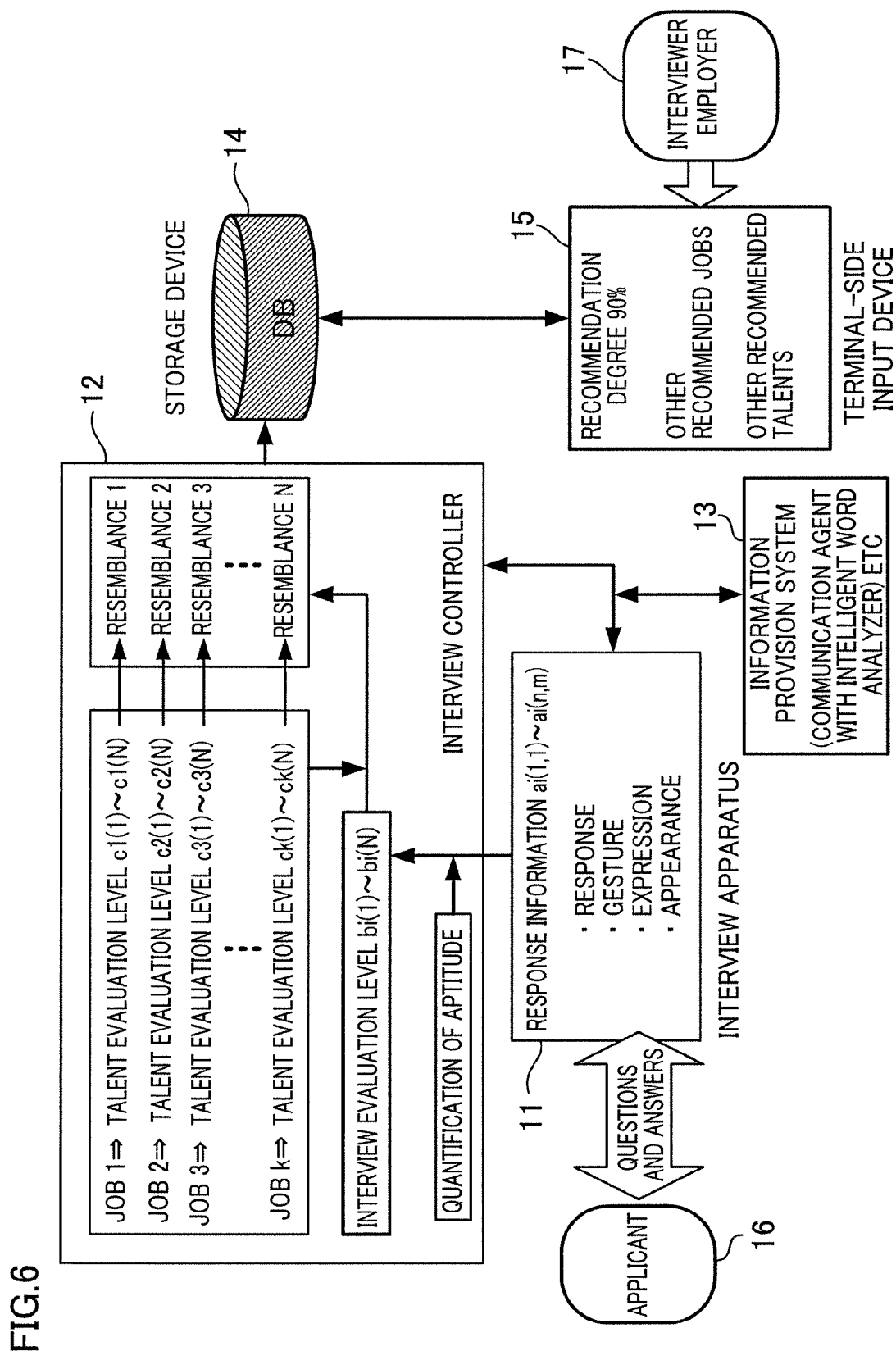
FIG. 6 illustrates the flow of information in the interview system.

As shown in FIG. 6, sets of response information ai (1, 1) to ai (n, m) are input to the interview controller 12 from an interview apparatus 11 which has conducted questions and answers with an applicant 16. The sets of response information ai (1, 1) to ai (n, m) are formed of a plurality of response items (1, 1) to (n, m) such as answers, gestures, expressions, and appearance of the applicant 16 obtained by the robot main body 111 and key inputs and timings obtained by the interview-side input device 112, which are collected for each applicant 16.

Figure 7:
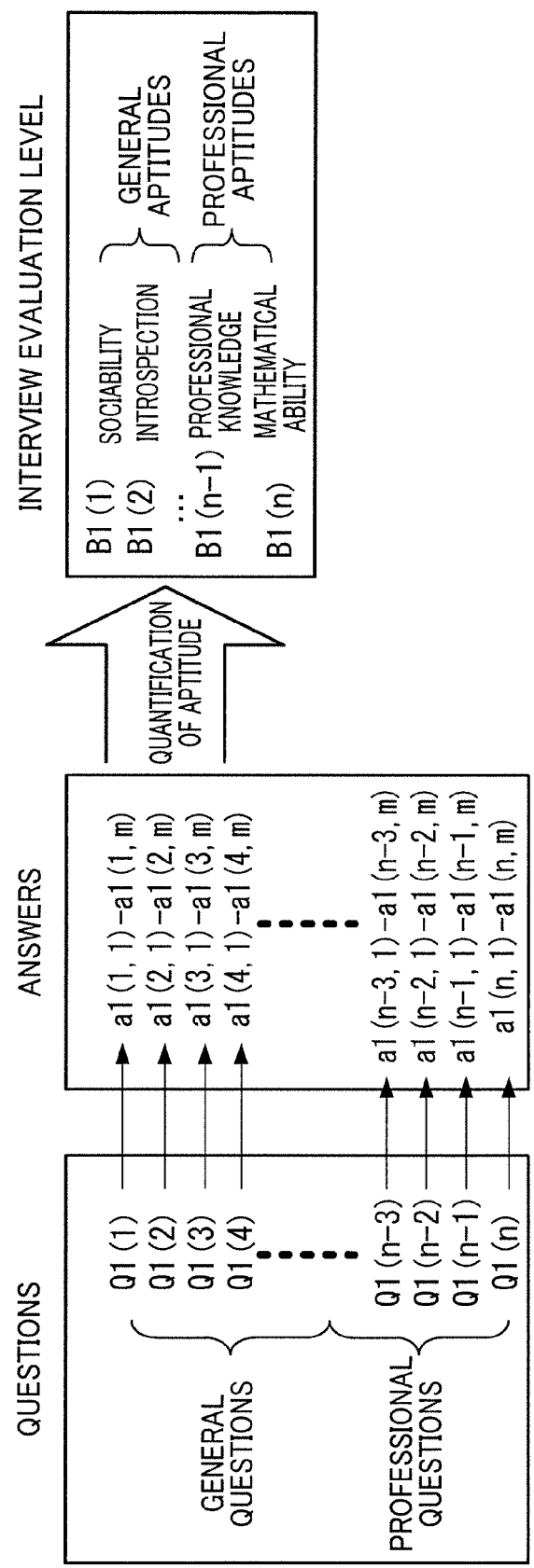
FIG. 7 illustrates the relationship between questions and answers and interview evaluation levels.

For example, as shown in FIG. 7, questions and answers for one applicant 16 are constituted by two types, i.e., questions and answers for testing general aptitude and questions and answers for testing professional aptitude. The questions and answers for testing general aptitude are done to know predominantly activeness, enthusiasm, and emotional quality through a personality test and a general knowledge test. The questions and answers for testing professional aptitude are done to know the aptitude for the job that the applicant 16 has selected at the time of application, through a professional knowledge test or the like.

Figure 8:
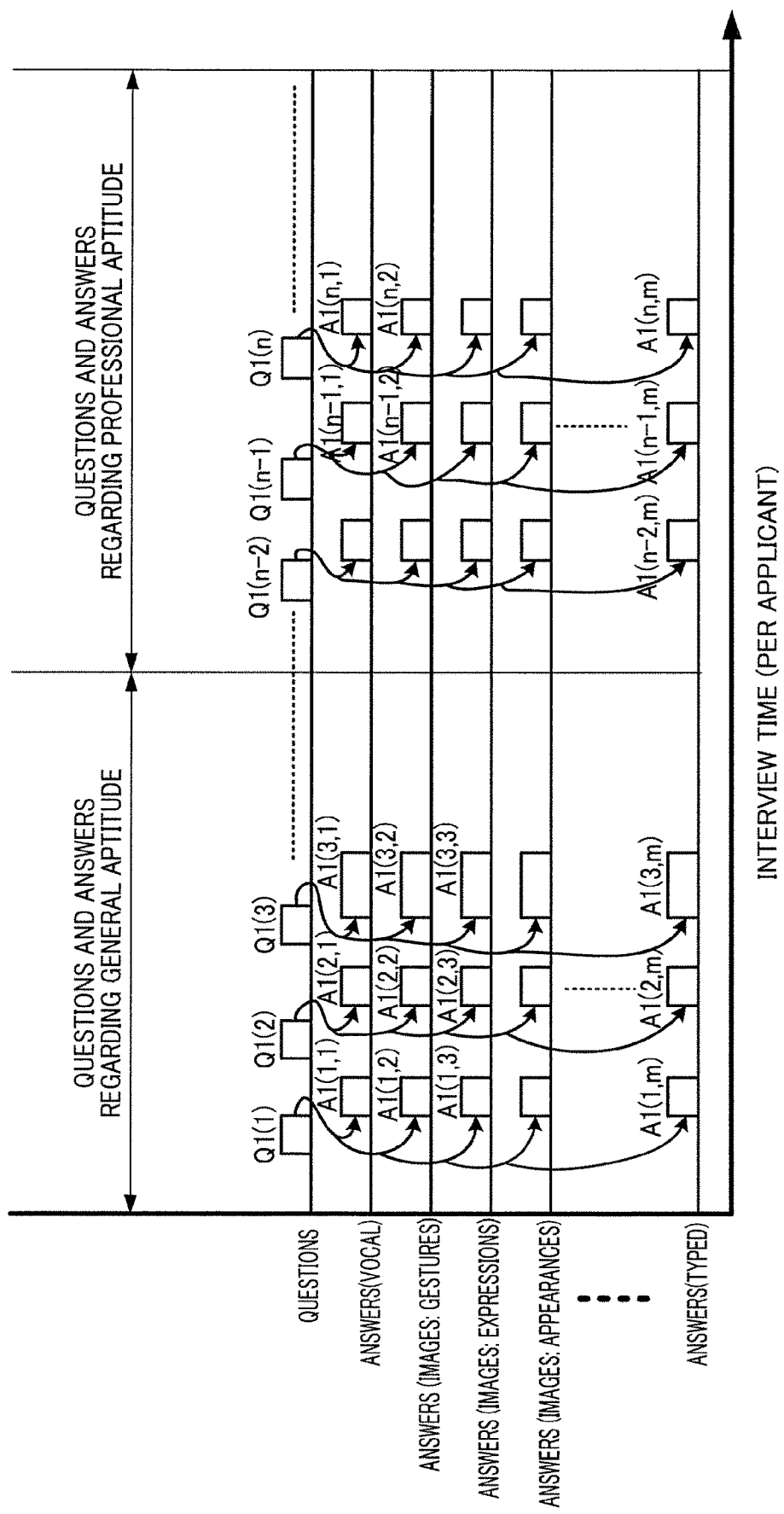
FIG. 8 is a timing chart of the questions and answers.

To be more specific, as shown in FIG. 8, an applicant 16 with A1 (applicant ID) is asked the first question Q1(1). In response to the question Q1(1), responses A1(1, m) such as a verbal response A1(1, 1) of the applicant 16, an image response (gesture) A1(1, 2), an image response (expression) A1(1, 3), and key input response A1(1, m) are obtained. In response to the third question Q1(3), sets of response information a1(1, 1) to a1(3, m) are obtained. The sets of response information ai (1, 1) to ai (n, m) in response to the questions Q1(1) to Q1(n) are stored in an applicant information table shown in FIG. 9. The sound is converted to texts by the interview controller 12. The details of the applicant information table will be given later.

As shown in FIG. 6, the sets of response information ai (1, 1) to ai (n, m) obtained through questions and answers with one applicant 16 are quantified by a quantification process to interview evaluation levels bi(1) to bi(N). The interview evaluation levels bi (1) to bi (N) indicate the general aptitude and the professional aptitude in the form of numbers. To be more specific, the general aptitude is quantified based on the sets of response information ai (1, 1) and so forth obtained from the general questions Q1(1) and so forth, as shown in FIG. 7. For example, sociability is quantified as an interview evaluation level bi (1), introspection is quantified as an interview evaluation level bi (2), and smile is quantified as an interview evaluation level bi (3).

Furthermore, the professional aptitude is quantified based on the sets of response information ai (n, m) and so forth obtained from the professional questions Q1 ($n$) and so forth. For example, professional knowledge is quantified as an interview evaluation level bi (n−1), and mathematical ability is quantified as an interview evaluation level bi (N).

As shown in FIG. 6, the interview evaluation levels bi (1) to bi (N) are compared with talent evaluation levels ci (1) to ci (N) which are set for each of the jobs 1 to N, respectively. Then resemblances 1 to N of the interview evaluation levels bi (1) to bi (N) with the respective talent evaluation levels ci (1) to ci (N) are calculated. The talent evaluation levels ci (1) to ci (N) are averages of a plurality of sets of the interview evaluation levels bi (1) to bi (N) which are obtained in such a way that more than one person suitable for the respective jobs 1 to N such as receptionist, sales staff, and cleaner had, as the applicants 16, interviews by the interview system 1. For this reason, each applicant 16 is likely to be suitable for one of the jobs 1 to N, with which the resemblance of the interview evaluation levels bi (1) to bi (N) with the talent evaluation levels ci (1) to ci (N) is the highest. For example, an applicant 16 with a high interview evaluation level bi (3) which is associated with smile is likely to be suitable for a receptionist because of high resemblance between the interview evaluation level bi (3) and the talent evaluation level ci (3) of the receptionist. What kinds of people are suitable for the respective jobs 1 to N may be determined by a past employment model which is based on people employed in the past or a model based on personalities of celebrities, famous entrepreneurs, famous business people, and so on.

(Interview System: Information Provision System)

The information provision system 13 is connected to be able to send and receive an information signal to and from the interview controller 12. The information provision system 13 is also termed a communication agent with intelligent word analyzer, and includes an input receiver configured to receive an input text string (e.g., a question input by the applicant 16) input by voice or keys from the interview apparatus 11 operated by the applicant 16, a response content determining unit (e.g., a response content determining unit 212 of an information provision server 200) configured to determine a response content (e.g., an answer to the question of the applicant 16) corresponding to the input text string based on knowledge data, and a response data generator configured to generate response data including the response content determined by the response content determining unit and send it to the interview apparatus 11 via the interview controller 12.

The knowledge data includes a comparison target text string which is a target of comparison with the input text string and a response text string associated with the comparison target text string. The response content determining unit is configured to compare the input text string with the comparison target text string. When determining that the comparison target text string is semantically closest to the input text string and the resemblance in meaning is greater than a certain degree, the response content determining unit sets the response text string associated with that comparison target text string as a response content.

With this arrangement, the information provision system 13 is able to cause the robot main body 111 to verbally output a response evaluated as the best answer or cause the interview-side input device 112 to display the response in response to a question from the applicant 16, so that the interview apparatus 11 and the applicant 16 perform questions and answers like human interactions.

(Interview System: Storage Device)

The storage device 14 stores the applicant information database. The applicant information database is stored in the form of an applicant information table shown in FIG. 9. The applicant information table includes an applicant column, a response information column, an interview evaluation level column, and a plurality of resemblance columns (1 to N). The applicant column stores identification numbers (A1, A2, etc.) which are unique to respective applicants. The response information column stores the sets of response information ai (1, 1) to ai (n, m) associated with each applicant. The interview evaluation level column stores the interview evaluation levels bi (1) to bi (N) associated with each applicant. The resemblance columns (1 to N) are associated with the jobs 1 to N. The higher the number, the higher the resemblance is.

For example, in regard to an applicant 16 with an identification number A1, when the resemblance 1 is 20, the resemblance 2 is 56, the resemblance 3 is 84, and the resemblance N is 15, the resemblance 3 is high. This indicates that the applicant A1 is suitable for the job 3 corresponding to the resemblance 3. Meanwhile, in regard to an applicant A3, when the resemblance 1 is 24, the resemblance 2 is 90. the resemblance 3 is 11, and the resemblance N is 78, the resemblance 2 and the resemblance N are high. This indicates that the applicant A3 is suitable for the jobs 2 and N corresponding to the resemblance 2 and the resemblance N.

(Interview System: Terminal Device)

As shown in FIG. 1, the storage device 14 is arranged to be able to perform data communications with the terminal device 15. The terminal device 15 includes a display device such as a display and an input device such as a keyboard. By accessing the applicant information database in the storage device 14 in response to an input from the recruiter 17, the terminal device 15 makes it possible to sample an applicant 16 suitable for a particular job.

To be more specific, the terminal device 15 includes a terminal-side input device 151 by which a job opening can be input, a display device 152, and a terminal controller configured to display, on the display device 152, the degree of recommendation of each applicant 16 to a job opening in association with the resemblance. For example, in FIG. 6, the degree of recommendation determined based on the resemblance between an applicant 16 and his/her desired job is displayed as "Recommendation Degree: 90%". In this way, as a job opening is input by the terminal-side input device 151, an applicant suitable for the job opening is easily and rapidly selected from applicants 16, based on the degree of recommendation of each applicant 16 displayed on the display device 152. The degree of recommendation may be represented by numbers or colors, as the resemblances are classified into a plurality of stages such as 10 stages. When the degrees of recommendation are indicated by colors, it is easy to narrow down a large number of applicants 16.

The terminal controller of the terminal device 15 may cause the display device 152 to display jobs with resemblances which are higher than a predetermined value. For example, in FIG. 6, jobs with resemblances equal to or higher than a predetermined value such as 90 may be sampled and displayed as "other recommended jobs". In this case, in addition to the degree of recommendation of each applicant 16 to the job opening displayed on the display device 152, it is possible to easily check what other jobs are suitable for each applicant 16. Furthermore, a list of names of other applicants 16 whose resemblances to the job desired by the applicant 16 displayed on the display device 152 are equal to or higher than a predetermined value may be displayed as "other recommended talents" in the descending order of resemblance. This makes it easy to narrow down the applicants.

(Interview System: Interview Process)

Figure 10:
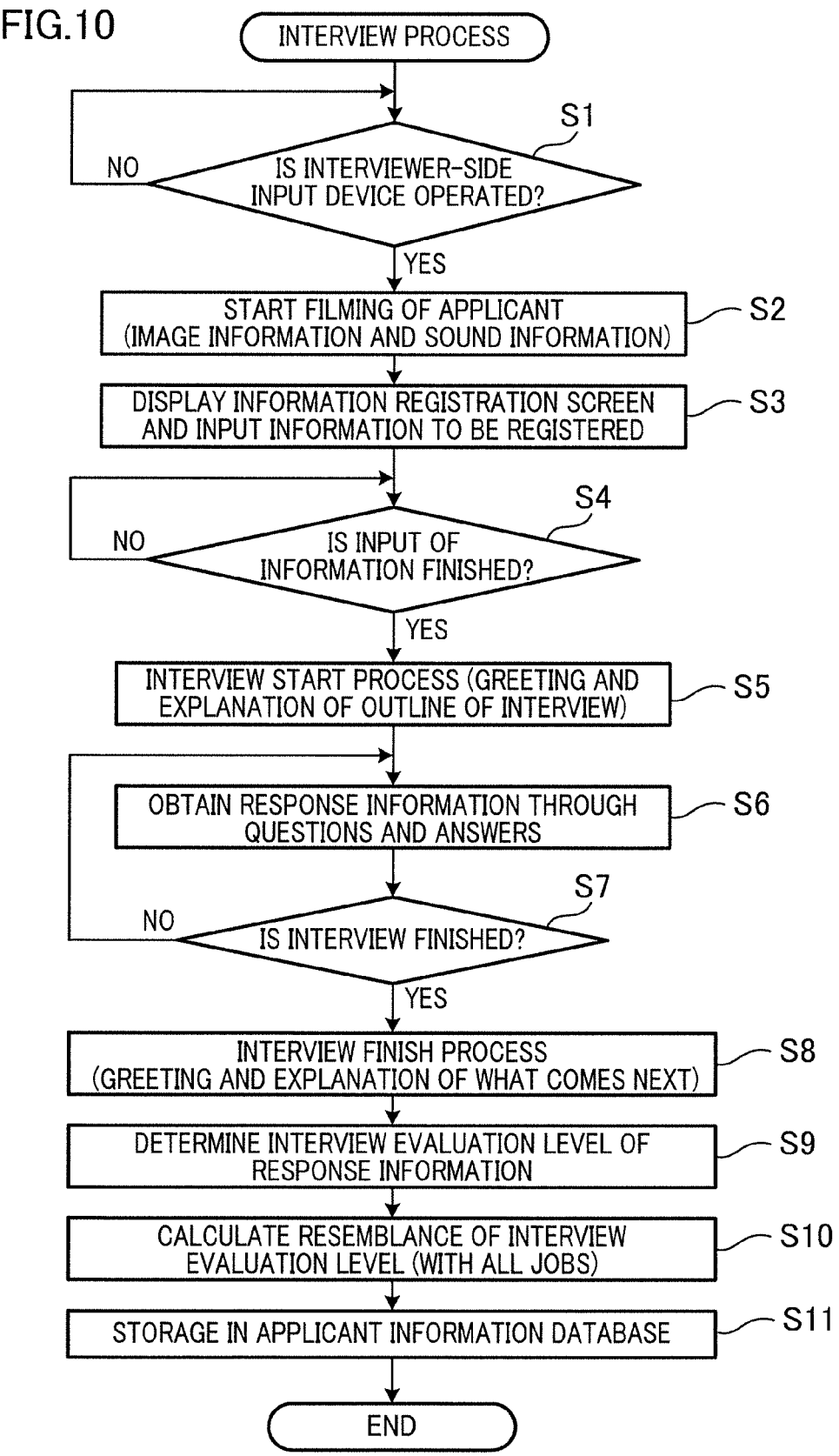
FIG. 10 is a flowchart of an interview process routine.

In regard to the arrangement described above, an interview process carried out by the interview system 1 will be detailed with reference to an interview process routine executed by the interview controller 12, which is shown in FIG. 10.

Figures 11A, 11B:
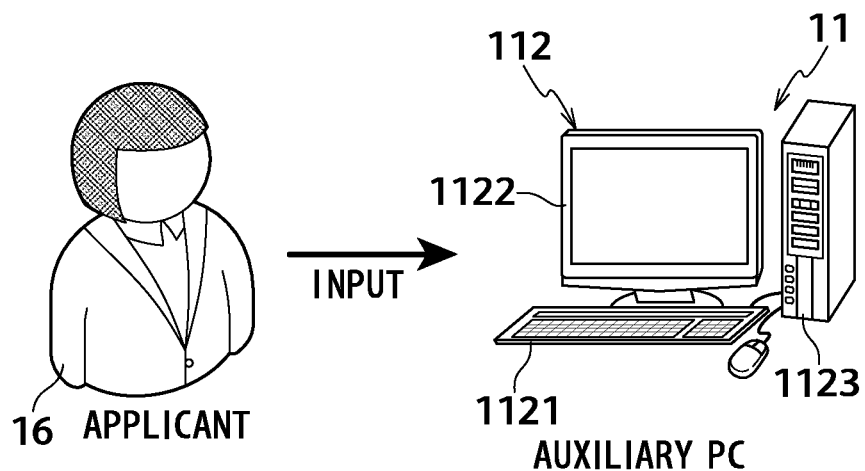
FIG. 11A illustrates a process of interview with an applicant.
FIG. 11B shows a registration screen image.

To begin with, whether an applicant 16 has operated the interview-side input device 112 of the interview apparatus 11 is determined (S1). When not operated (S1: NO), the operation is waited for as S1 is repeatedly executed. Thereafter, as shown in FIG. 11A, when the applicant 16 operates the interview-side input device 112 (S1: YES), a camera mounted on the head 111d of the robot main body 111 or the analysis device 119 shown in FIG. 2 start to film the applicant 16 (S2). As a result, as response information, image information and sound information of the applicant 16 are transmitted from the robot main body 111 to the interview controller 12.

Subsequently, as shown in FIG. 11B, an information registration screen 2 is displayed and an input of information to be registered is received (S3). The information registration screen 2 is a card-like input screen having an input column 21 for inputting a name, a telephone number, a mail address, and a desired job and a registration button 22 by which completion of registration is indicated. The information registration screen 2 requires each applicant 16 to input only necessary minimum information, in order to avoid erroneous decision by the recruiter 17 on account of excessive information.

Then whether the registration of information has been completed is determined (S4). When the input has not been completed (S4: NO), completion of input of information is waited for as S4 is repeatedly executed. When the input has been completed (S4: YES), an interview start process is executed (S5). To be more specific, the robot main body 111 makes a bow, introduces oneself, and then explains the flow of the interview. While verbally explaining the flow of the interview, the robot main body points a screen displayed on the interview-side input device 112 to indicate what kinds of operations are to be done.

After the explanation of the interview, as shown in FIG. 12, questions and answers are carried out between the robot main body 111 and the applicant 16. The questions and answers are classified into general ones regarding the personality and general knowledge of the applicant 16 and professional ones regarding professional knowledge, in order to test the general aptitude and the professional aptitude. During the questions and answers, the validity and correctness of the answers of the applicant 16 may be determined by using the Internet. Then response information regarding the motion and voice of the applicant 16 is acquired by the robot main body 111 and response information input by keys into the interview-side input device 112 by the applicant 16 is acquired (S6).

The acquisition of the response information is continued until the end of the interview (S7). When the interview is finished (S7: YES), then an interview finish process is executed (S8). To be more specific, after the greeting at the end of the interview by the robot main body 111, the flow after the interview, e.g., when an interview result is informed, is explained.

Subsequently, as shown in FIG. 13, the interview evaluation levels of the response information including the conversations between the applicant 16 and the robot main body 111 are determined (S9), and calculation of the resemblance of the interview evaluation levels is carried out for each of all jobs (S10).

To be more specific, as shown in FIG. 6, when the sets of response information ai (1, 1) to ai (n, m) indicating answers, gestures, etc. are input from the interview apparatus 11 which has conducted questions and answers with an applicant 16, the interview evaluation levels bi (1) to bi (N) are obtained as quantification of the general aptitude and the professional aptitude based on the sets of response information ai (1, 1) to ai (n, m). The interview evaluation levels bi (1) to bi (N) are compared with the respective talent evaluation levels ci (1) to ci (N) of each of the jobs 1 to N, so that the resemblances 1 to N of the interview evaluation levels bi (1) to bi (N) with the talent evaluation levels ci (1) to ci (N) are calculated. Sets of information such as the sets of response information ai (1, 1) to ai (n, m) and the resemblances 1 to N obtained as above are stored in the storage device 14 as the applicant information database (S11). When the interview process routine is finished, the interview of one applicant 16 is finished. As the applicants 16 are interviewed one by one, data is accumulated to the applicant information database. When a plurality of interview apparatuses 11 are provided, data is accumulated to the applicant information database in a parallel manner.

Figure 14A:
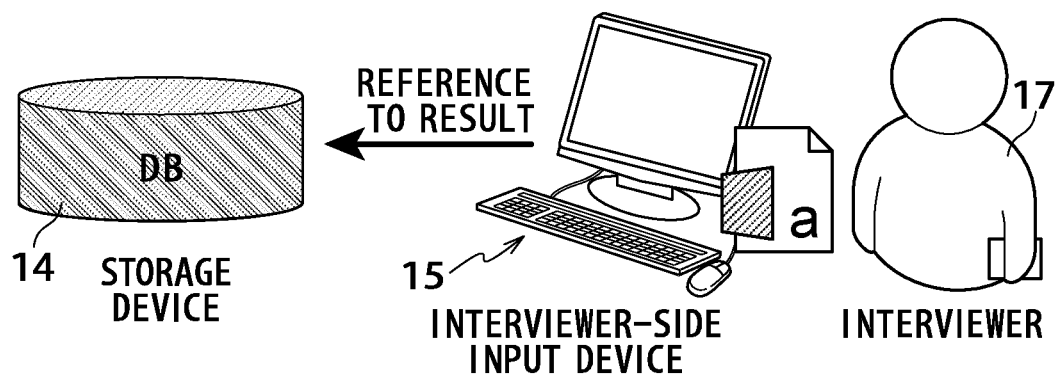
FIG. 14A illustrates how an interview result is used by a recruiter.
Figure 14B:
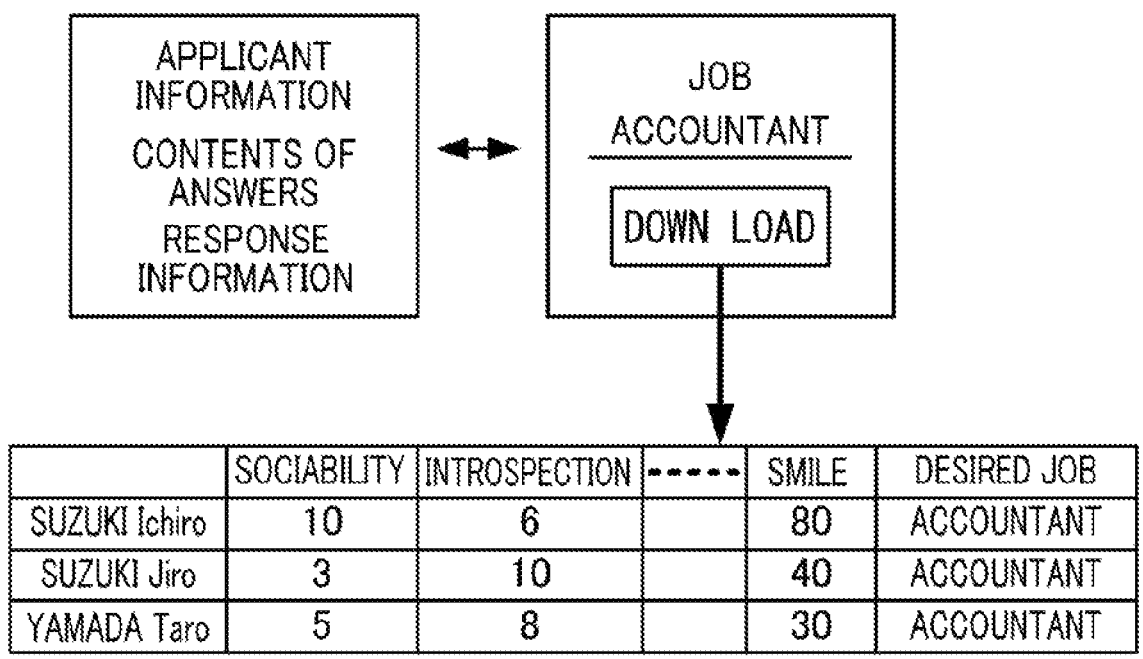
FIG. 14B shows a display screen of an interview result.

During or after the interview, as shown in FIG. 14A, the recruiter 17 may view interview results by accessing the applicant information database in the storage device 14 via the terminal device 15. When the database is viewed, for example, as shown in FIG. 14B, an interview result of each applicant 16 and a list of candidates for each desired job are displayed in a selectable manner.

In the interview result of each applicant, the sets of response information ai (1, 1) to ai (n, m), the interview evaluation levels bi (1) to bi (N), the resemblances 1 to N and the like of one applicant 16 are displayed. For example, as "applicant information", information registered at the time of the application, which is constituted by a name, a phone number, a mail address, and a desired job, is displayed. Furthermore, as "response content", questions which are important in assessing the aptitude for the desired job are displayed, and answers to these questions are retrieved from the sets of response information ai (1, 1) to ai (n, m) and displayed. Furthermore, as the "response information", the sets of response information ai (1, 1) to ai (n, m) other than the answers displayed in the response content above are displayed. As the "response information", the expression and look of the applicant 16 at the time of the response may be displayed in the form of a still image or a moving image.

The list of candidates for each desired job is displayed in such a way that, for example, when a desired job is "accountant", a list of applicants 16 who have selected "accountant" as a desired job is displayed. To be more specific, in addition to the name and the desired job of each applicant 16, the interview evaluation levels bi (1) to bi (N) such as sociability, introspection, and smile are displayed. Furthermore, the terminal device 15 may display a list of applicants 16 with high resemblances to the job, e.g., accountant.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/ received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. An interview system comprising:
   an interview apparatus configured to obtain response information from an applicant through questions and answers with the applicant, the interview apparatus including interview-side apparatus including a key-input apparatus and being configured to obtain from the applicant, as response information, input information regarding content of input by the applicant and operation information regarding an input operation performed by the applicant;
   an interview controller configured to control the interview apparatus and to calculate an interview evaluation level based on the response information obtained by the interview apparatus, which interview evaluation level quantifies aptitude of the applicant for a given job;

a storage device configured to store an applicant information database in which the response information and the interview evaluation level are stored in association with the applicant; and a terminal device configured to be able to access the applicant information database in the storage device;

wherein the applicant information database stores, in an applicant information table, the response information and the interview evaluation level in association with identification information unique to each applicant that uses the interview system;

wherein the interview controller is configured such that when a response by key input is received from the applicant using the key-input apparatus in response to a question or instruction that has been issued to the applicant, at least one of key-input-related parameters including speed, rhythm, and timing of key input is stored in the applicant information database in association with the applicant as new operation information, and similarity between 1) the new operation information that is stored in the applicant information database in association with the applicant and 2) operation information that is stored in the applicant database in association with another person who has filled the same position for which the applicant is applying is determined; and wherein the interview controller is configured to calculate resemblance of the interview evaluation level with a plurality of predetermined talent evaluation levels, each of which predetermined talent evaluation levels quantifies a best aptitude for each of a plurality of available jobs and each of which predetermined talent evaluation levels is an average of a plurality of interview evaluation levels that have been previously obtained from a plurality of people suitable for a given job.

2. An interview system comprising:

an interview apparatus configured to obtain response information through questions and answers with an applicant, the interview apparatus including interview-side apparatus including a key input device and being configured to obtain from the applicant, as response information, input information regarding a content input by the applicant and operation information regarding an input operation performed by the applicant;

an interview controller configured to control the interview apparatus and calculate an interview evaluation level which quantifies aptitude of the applicant for a given job based on the response information obtained by the interview apparatus;

a storage device configured to store an applicant information database in which the response information and the interview evaluation level are stored in association with the applicant; and a terminal device configured to access the applicant information database in the storage device, the interview controller calculating resemblance of the interview evaluation level with a plurality of predetermined talent evaluation levels, each of which predetermined talent evaluation levels quantifies a best aptitude for each of a plurality of available jobs and each of which predetermined talent evaluation levels is an average of a plurality of interview evaluation levels that have been previously obtained from a plurality of people suitable for a given job, and the storage device being configured to store the applicant information database in which the resemblance of the interview evaluation level to the talent evaluation levels in association with the applicant.

3. An interview system comprising:

an interview apparatus configured to obtain response information through questions and answers with an applicant;

an interview controller configured to control the interview apparatus and determine an interview evaluation level which quantifies aptitude of the applicant for a given job based on the response information which is related to at least one of key input elements obtained by the interview apparatus;

a storage device configured to store an applicant information database in which jobs suitable for previously employed applicants, the response information, and the interview evaluation level are stored in association with the applicant; and a terminal device configured to access the applicant information database in the storage device, the interview controller calculating resemblance of the interview evaluation level with a plurality of predetermined talent evaluation levels, each of which predetermined talent evaluation levels quantifies a best aptitude for each of a plurality of available jobs and each of which predetermined talent evaluation levels is an average of a plurality of interview evaluation levels that have been previously obtained from a plurality of people suitable for a given job, and the storage device storing in the applicant information database resemblance of an applicant with the talent evaluation levels of previously employed applicants that were suitable for the respective jobs, whereby identification of an applicant suitable for a job opening is facilitated by sampling and reordering applicants based on resemblance of the interview evaluation level of each applicant with the talent evaluation levels of the previously employed applicants.

* * * * *